United States Patent Office 3,370,000
Patented Feb. 20, 1968

3,370,000
PURIFICATION OF COAL TAR
FRACTION WITH HCl
Gerald Gilbert, San Francisco, Calif., and Charles
Perlaky, Pittsburgh, Pa., assignors to United States
Steel Corporation, a corporation of Delaware
No Drawing. Continuation-in-part of application Ser. No.
180,307, Mar. 16, 1962. This application Apr. 1, 1965,
Ser. No. 444,855
1 Claim. (Cl. 208—254)

ABSTRACT OF THE DISCLOSURE

Indole and indole-like impurities in coal-tar fractions boiling between about 230° and 280° C., which inhibit liquid-phase catalytic oxidation of the methylnaphthalenes in such fractions to naphthalene carboxylic acids, are removed by treating these fractions at between about −20° and 60° C. with hydrogen chloride, chlorine or hydrochloric acid having a concentration between about 30% and 37% by weight HCl. This is followed by distillation or an organic-aqueous phase separation. The inhibitors, converted to polymers are dissolved in the aqueous phase or remain as still bottoms.

---

This application, which is a continuation-in-part of our co-pending application Ser. No. 180,307, filed Mar. 16, 1962, now abandoned, relates to methods for removing impurities from coal-tar fractions that inhibit the catalytic liquid-phase oxidation of any alkyl aromatic compound in the fraction to its corresponding acid.

It is known, e.g., from Barker et al. Patent No. 2,963,508, catalytically to oxidize toluene, xylene and reagent-grade methylnaphthalenes derived from coal tar. It is not generally known, however, that, with crude, methylnaphthalene-containing, coal-tar fractions boiling over a wide range, no such reaction occurs. These fractions contain substances which inhibit the catalytic action of the copper, cobalt or other heavy-metal compounds customarily used and prevent the oxidation reaction from occurring at all, as contrasted with substances that are catalyst poisons and affect the rate of oxidation. These substances are nitrogen-containing, indole-type impurities.

In the practice of our invention, a coal-tar fraction containing a methylnaphthalene, e.g., a monomethylnaphthalene, a dimethylnaphthalene or a mixture thereof, is first treated with hydrogen chloride to convert impurities therein to a removable form. The converted impurities are separated from the treated mixture. This leaves a processed, coal-tar fraction amenable to liquid-phase catalytic oxidation.

Treatment of a fraction, e.g., one boiling between about 230° and 280° C., with hydrogen chloride may be effected in a number of ways. For example, gaseous hydrogen chloride may be bubbled through the fraction or the fraction may be stirred or agitated with concentrated hydrochloric acid. It is also possible to bubble gaseous chlorine through the fraction. In this latter instance, the indole-type impurities are chlorinated and hydrogen chloride is formed in situ. The amount of reagent to be used in the practice of the invention depends on the content of impurities in the coal-tar fraction. We have found that satisfactory results are obtained with about 5 to 10 percent of the reagent by weight of the coal-tar fraction to be treated.

In general, separation of treated fractions consists in organic-aqueous phase separation or distillation at atmospheric or sub-atmospheric pressures. Where the treating agent is concentrated hydrochloric acid or where the reacted fraction contains an effective concentration of hydrochloric acid, it has been found that the converted impurities are soluble in the aqueous phase. In this instance, the purified organic phase may be separated very simple from the aqueous phase containing the impuriites. Alternatively, distilling any treated coal-tar fraction will separate the converted impurities which boil at relatively high temperatures and remain in the residue, from the purified methylnaphthalenes which boil at relatively low temperatures and are collected as distillate. At atmospheric pressure, the distillation range may be the same as for the crude coal-tar fraction, e.g., between about 230° and 280° C. However separated, the purified coal-tar fraction or organic phase is then amenable to a catalytic, liquid-phase oxidation step.

If desired, prior to separation, the treated coal-tar fraction may be washed with water or with an aqueous solution of a base, such as sodium hydroxide, sodium carbonate or sodium bicarbonate. The washing step, especially with an alkali, will serve to remove chlorine, hydrogen chloride, and organic acids. Prior to distillation or the catalytic oxidation step, the fraction may be dried, for example, with calcium chloride.

In the above-described treatments with hydrogen chloride, there are preferred and critical limits in concentration and temperature. A concentration of hydrochloric acid, effective to dissolve converted impurities, will also effect rapid conversion of indole and indole-type impurities to their separable, polymerized form. The maximum concentration is limited by the available commercial concentrated hydrochloric acid (23° Bé., 37.5% HCl by weight). As the concentration decreases, it takes longer for the polymerization reaction to reach completion. Additionally, the polymers become progressively less soluble in the more dilute acid. Thus, use of a solution that is too dilute will necessitate excess reaction time and filtration to separate undissolved, polymerized impurities. In addition, cleaning of the reaction vessel to remove polymerized impurities may be required. Satisfactory production and solubility of polymers have been attained with a 31.5% by weight HCl solution (20° Bé.). Hence, the preferred concentration is between about 30% and 37% by weight HCl solution. As a lower limit in this range, about 30% by weight HCl solution is critical since with below about 30% solutions indole and indole-like impurities are not removed from a coal-tar fraction to an extent sufficient to permit a said conventional oxidation reaction with a treated fraction. It is of course understood that water may be present in the reaction vessel, where hydrogen chloride or chlorine is used, to produce an effective hydrochloric-acid concentration.

These reactions can take place at room temperature and atmospheric pressure, since a 230°–280° C. fraction is liquid at room temperature. As the temperature is decreased, for example, to about −20° C., the reaction becomes slower and the reaction mixture may freeze. The reactions are not affected by temperatures somewhat above room temperature. However, above about 60° C., when using chlorine, the undesirable chlorination of methylnaphthalenes and their consequent loss, becomes progressively more rapid. Also, above about 60° C., the hydrogen-chloride reaction with indole-type impurities goes beyond the easily-separable polymer stage. It proceeds rapidly to polymers of higher molecular weight, which are obtained as a gummy residue, insoluble in concentrated hydrochloric acid. Hence, the preferred temperature range is between about −20° and 60° C., with 60° C. as a critical upper limit in this range for producing lower molecular weight polymers soluble in the above-defined concentrated HCl solutions.

The reaction between chlorine and indole-type impurities produces chlorinated indoles, hydrogen chloride and heat. The hydrogen chloride formed in situ further reacts with chlorinated indoles to produce the described, separable polymers. This reaction is also exothermic. Both reactions are essential, since it has been demonstrated that, if sodium bicarbonate is present and the hydrogen chloride is destroyed as formed, the chlorinated indoles per se cannot be separated by distillation from the methylnaphthalenes. The reactions being exothermic, it is preferred to cool the reaction vessel and operate at about room temperature.

A complete understanding of the invention may be obtained from the following typical examples of our process:

*Example 1*

A 100 g. sample of a crude coal-tar methylnaphthalene fraction boiling in the range 230° to 250° C. and containing about 68 percent monomethylnaphthalenes was agitated for a few minutes at room temperature with 100 ml. of concentrated hydrochloric acid (23° Bé.). The organic and aqueous layers were separated. A 10 g. sample of the organic layer containing 77.3 percent monomethylnaphthalenes was oxidized in the liquid phase, to naphthoic acids in accordance with a known method. A mixture of the 10 g. sample, 0.3 g. of cobaltous acetate tetrahydrate, 0.6 g. of manganous acetate tetrahydrate, 0.4 g. of ammonium bromide, and 75 ml. of propionic acid were placed in a 100-ml., three-neck flask fitted with condenser, stirrer, and thermometer. Oxygen at 0.4 mole per hour was bubbled through the mixture at reflux temperature (140° C.) for 5 hours with continuous stirring (1500 r.p.m.). Then the mixture was poured into 600 ml. of water to precipitate the naphthoic acids. The precipitate was separated by filtration, dissolved in dilute NaOH to separate the small amount of diphenyl, and reprecipitated with dilute HCl. The naphthoic acids were separated by filtration, washed several times with water, and dried. The amount of naphthoic acids produced was 9.8 g. (94% purity). The oxidation yield was 98.4 percent, based on the methylnaphthalene content of the starting material.

*Example 2*

A 100 g. sample of a crude coal-tar methylnaphthalene fraction boiling in the range 230° to 250° C. and containing about 68 percent monomethylnaphthalenes was agitated for a few minutes at room temperature with 100 ml. of 23° Bé. hydrochloric acid. The organic layer, after separation, was washed with 100 ml. of 20 percent NaOH solution, and distilled through a short Vigreux column at atmospheric pressure. A 10 g. sample of the distillate (81.5 percent monomethylnaphthalenes) was oxidized in the liquid phase to naphthoic acids, as described in Example 1. The amount of naphthoic acids was 9.8 g. (94% purity). The oxidation yield was 93.3 percent.

*Example 3*

Chlorine gas (5 g.) was bubbled through a 95 g. sample of a coal-tar fraction containing 68 percent monomethylnaphthalenes and boiling in the range 230° to 255° C. The flask was cooled to maintain the fraction at about room temperature. In this example, the chlorine reacted was 5 percent by weight of the fraction to be purified. The chlorinated fraction was washed with 100 ml. of water and neutralized with 10 percent NaOH solution. After separation of the organic and aqueous phases, the organic phase was distilled through a short Vigreux column at atmospheric pressure. Distillate was recovered at temperatures in the range 230° to 255° C. Impurities remained as residue. A 10 g. sample of the distillate (64.5 percent monomethylnaphthalenes) was oxidized by a known catalytic liquid-phase technique, as described in Example 1, to produce naphthoic acids. A 6.8 g. yield of naphthoic acids was obtained. The purity of the product was 95 percent as determined by potentiometric titration. The yield in the oxidation was 82.7 percent, based on the methylnaphthalene content of the starting material.

*Example 4*

At room temperature, chlorine gas was bubbled through a 15 g. sample of a commercial coal-tar dimethylnaphthalene (64 percent dimethylnaphthalenes, 22 percent diphenyl) boiling in the range of 250° to 280° C. The treated sample was distilled through a short Vigreux column at atmospheric pressure. As described in Example 1, a 10 g. sample of the distillate was oxidized in the liquid phase to naphthalene dicarboxylic acids. Ten grams of product were obtained. The purity of the product was 78 percent as determined by potentiometric titration. The yield in the oxidation was 88 percent based upon the dimethylnaphthalene content of the starting material.

*Example 5*

To a 46 g. sample of a coal-tar fraction boiling in the range 230° to 255° C. and containing about 68 percent monomethylnaphthalenes, 3.75 g. of chlorine gas was introduced under cooling at room temperature. The chlorine introduced was 7.5 percent by weight of the coal-tar fraction to be treated. The treated fraction was then washed with 50 ml. of water and neutralized with 10 percent NaOH solution. After separation, the organic layer with distilled through a short Vigreux column at atmospheric pressure. A 10 g. sample of the distillate (66.7 percent monomethylnaphthalenes) was oxidized in the liquid phase, as described in Example 1, to naphthoic acids. A 6.2 g. yield (94% purity) of naphthoic acids was obtained. The yield in the oxidation was 72.9 percent.

The invention is characterized by several distinct advantages. In the first place, it provides a simple, relatively economical process for upgrading coal-tar feedstocks in the methylnaphthalene range of about 230° to 280° C., containing inhibitors to a subsequent catalytic oxidation to the corresponding aromatic acids. Fractions boiling over relatively wide temperature ranges can be purified easily of their catalysis-inhibiting impurities. While pure indole boils at 254° C., we have observed indole azeotropes boiling between 230° and 245° C. We believe there are other nitrogen-containing or indole-type inhibitors of these catalytic reactions which our invention can eliminate from these and other coal-tar fractions.

Secondly, we have found our simplest method to be extremely effective. This is to stir a coal-tar fraction with hydrochloric acid having a concentration effective to dissolve converted impurities and to separate by gravity a purified organic phase from the inorganic hydrochloric acid phase containing the dissolved impurities. An acid concentration effective to dissolve will also convert the indole-type impurities to polymers expeditiously. A so-purified fraction may be catalytically oxidized, as is. This simplicity of purification contrasts sharply with use of other mineral acid washing solutions. For example, we have found that, with a concentrated sulphuric-acid solution, large amounts of intractible gums are formed that makes the treated methylnaphthalene fraction difficult to handle. Additionally, fractions treated with dilute HCl solutions and dilute or concentrated sulphuric and other acid solutions do not produce uninhibited fractions amenable to catalytic oxidation.

Thirdly, our invention is simple and less costly to operate than other methods we have used for removing indole-type impurities. These require more expensive reagents and equipment or result in decreased product yields. Apparently, it is necessary only to remove such impurities to yield a product amenable to catalytic oxidation. Our slightly more involved separation steps of water washing, acid neutralization and distillation to recover a purified methylnaphthalene fraction serve to eliminate co-existing tar acids in the crude coal-tar fraction, where this is advantageous. That the latter steps are not required is borne out by Examples 1 and 2. With similar starting fractions, the washed, distilled product of Example 2 had a greater monomethylnaphthalenes content than the Example 1 product. However, the Example 1 yield of oxidized product was 98.4% versus 93.3% for Example 2, the respective purities being 94%.

Although we have disclosed herein the preferred practice of our invention, we intend to cover as well any change or modification therein which may be made without departing from the spirit and scope of the invention.

We claim:

1. A method for treating a coal-tar fraction boiling between about 230° and 280° C. including indole and indole-like impurities which inhibit liquid-phase catalytic oxidation of the methylnaphthalenes in said fraction to naphthalene carboxylic acids when said fraction is subjected to said oxidation, comprising treating said fraction with hydrochloric acid at a temperature between about −20° and 60° C., said hydrochloric-acid concentration ranging between about 30% and 37% by weight HCl solution and separating a purified product now amenable to said catalytic oxidation from the aqueous phase containing dissolved, converted impurities.

References Cited

UNITED STATES PATENTS

| 3,052,742 | 9/1962 | Mills | 208—254 |
| 3,085,061 | 4/1963 | Metrailer | 208—281 |

FOREIGN PATENTS

| 298,484 | 2/1930 | Great Britain. |

SAMUEL P. JONES, *Primary Examiner.*